(12) United States Patent
Nickel et al.

(10) Patent No.: US 9,849,851 B2
(45) Date of Patent: Dec. 26, 2017

(54) FRONT SECTION FOR A MOTOR VEHICLE

(71) Applicant: GM GLOBAL TECHNOLOGY OPERATIONS LLC, Detroit, MI (US)

(72) Inventors: Marco Nickel, Ruesselsheim (DE); Martin Likar, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/087,184

(22) Filed: Mar. 31, 2016

(65) Prior Publication Data

US 2016/0288749 A1 Oct. 6, 2016

(30) Foreign Application Priority Data

Apr. 2, 2015 (DE) .................. 10 2015 004 416

(51) Int. Cl.
| | |
|---|---|
| *B60R 19/26* | (2006.01) |
| *B60R 19/36* | (2006.01) |
| *B62D 25/08* | (2006.01) |
| *B60R 19/12* | (2006.01) |
| *B60R 21/34* | (2011.01) |

(52) U.S. Cl.
CPC .............. *B60R 19/36* (2013.01); *B60R 19/12* (2013.01); *B62D 25/08* (2013.01); *B60R 2021/343* (2013.01)

(58) Field of Classification Search
CPC ......... B60R 19/36; B60R 19/12; B60R 25/08; B60R 2021/343
See application file for complete search history.

(56) References Cited

U.S. PATENT DOCUMENTS

| | | | | |
|---|---|---|---|---|
| 4,100,833 | A | * | 7/1978 | Nessa ................. F16B 13/0808 411/182 |
| 5,919,016 | A | * | 7/1999 | Smith ................. F16B 19/1072 411/183 |
| 7,114,587 | B2 | | 10/2006 | Mori et al. |
| 7,410,018 | B2 | | 8/2008 | Satou |
| 7,699,383 | B2 | | 4/2010 | Fukukawa et al. |
| 8,925,172 | B2 | * | 1/2015 | English ................. F16B 13/04 108/158.11 |

(Continued)

FOREIGN PATENT DOCUMENTS

| | | |
|---|---|---|
| DE | 102009017350 A1 | 10/2010 |
| DE | 102012022899 A1 | 5/2014 |
| JP | 2014231294 A | 12/2014 |

OTHER PUBLICATIONS

Great Britain Patent Office, Great Britain Search Report for Great Britain Application No. 1603976.0, dated Jul. 28, 2016.

(Continued)

*Primary Examiner* — Lori L Lyjak
(74) *Attorney, Agent, or Firm* — Lorenz & Kopf, LLP

(57) ABSTRACT

A front section for a motor vehicle includes a bumper cladding and a bumper stiffening which extends in the vehicle longitudinal direction between the bumper cladding and a supporting body part. A connecting unit including a blind nut and a threaded fastener is inserted from below into an opening of the body part to fix a rear edge region of the bumper stiffening on an underside of the body part. The blind nut has flexible legs which are reversibly splayed apart above the opening.

14 Claims, 2 Drawing Sheets

(56) References Cited

U.S. PATENT DOCUMENTS

| | | | |
|---|---|---|---|
| 2004/0143943 A1* | 7/2004 | Minami | F16B 37/067 24/453 |
| 2008/0001433 A1* | 1/2008 | Noyori | B60R 19/12 296/187.04 |
| 2012/0019027 A1 | 1/2012 | Tashiro et al. | |
| 2013/0031771 A1* | 2/2013 | Henneberry | F16B 13/0808 29/525.02 |
| 2014/0217758 A1 | 8/2014 | Nickel et al. | |

OTHER PUBLICATIONS

German Patent Office, German Search Report for German Application No. 102015004416.8, dated Jan. 19, 2016.

\* cited by examiner

FRONT SECTION FOR A MOTOR VEHICLE

CROSS-REFERENCE TO RELATED APPLICATION

This application claims priority to German Patent Application No. 102015004416.8, filed Apr. 2, 2015, which is incorporated herein by reference in its entirety.

TECHNICAL FIELD

The present disclosure pertains to a front section for a motor vehicle which is optimized with respect to different types of collision accidents.

BACKGROUND

DE 10 2009 017 350 A1 discloses a motor vehicle front section with a bumper cladding and a bumper stiffening which extends in the vehicle longitudinal direction between the bumper cladding and cross beam running transversely. Predetermined breaking connections are provided as threaded connections between the cross beam and the bumper stiffening. In the case of a relatively low-energy collision with a pedestrian, the threaded connections should remain intact, in the event of a more energetic collision, possibly with a wall, the shear loading should be sufficient to tear off or tear out the fastener and/or fastener holes.

The tearing out of the fastener holes necessarily includes damage to the cross beam which involves a costly repair. However, the alternative of tearing off of the fasteners is problematical. The force required for tearing off a fastener generally fluctuates unpredictably from case to case. If it is too low, the stiffening effect of the bumper stiffening in the case of a collision is unsatisfactory; if it is too high, collision forces can be transmitted to the cross beam and damage this, which in this case also significantly increases the costs of a subsequent repair.

SUMMARY

The present disclosure provides a front section for a motor vehicle in which even at higher collision energies than those typical of a pedestrian accident, the repair expenditure can be kept low. The front section for a motor vehicle is typically provided with a bumper cladding and a bumper stiffening which extends in the vehicle longitudinal direction between the bumper cladding and a supporting body part. In a configuration of the present disclosure, a connecting unit which fixes a rear edge region of the bumper stiffening on an underside of the body part is inserted from below into an opening of the body part and has flexible legs which are reversibly splayed apart above the opening. These legs can be compressed again under the action of a sufficient tensile force on the connecting unit so that the connecting unit can pass through the opening again and can release bumper stiffening and body part from one another. Since no material must tear or rupture for compressing the legs, but a continuous bending deformation is sufficient, the force required for withdrawing the connecting unit can be reliably determined by simulation and then set reproducibly.

The connecting unit includes a blind nut and a threaded fastener. The legs which are part of the blind nut are splayed apart by screwing the fastener into a thread of the blind nut. In order to enable such a splaying, parts of the legs in the unsplayed state can cross the axis of the thread so that the fastener during screwing into the thread must impact against these sections and must push them aside. The thread can be formed in a base plate of the blind nut and the legs extend out from the edges thereof. Such a blind nut can be manufactured cheaply in one piece from flat material such as a steel sheet, in particular by stamping and bending steps. The legs can each include a distal section and a proximal section connecting the distal section to the base plate where the two proximal sections diverge from the base plate. The distal sections can form the aforementioned sections crossing the axis of the thread in the unsplayed state.

The bumper stiffening and the body part can include sliding surfaces which contact one another at least when the bumper stiffening is pressed back against the body part by a collision. At least one of the sliding surfaces should be inclined towards the vehicle interior in order to convert a collision force directed horizontally towards the vehicle interior into a downward-directed tensile force which acts on the connecting unit. If the bumper stiffening includes a base plate and stiffening ribs projecting upwards from the base plate, one of the sliding surfaces can be formed by an edge of one of these ribs. This can include an upper edge of the relevant rib; As a result of a preferred embodiment, a recess is formed on a rear end of the rib facing the body part and the sliding surface is a part of the edge which delimits this recess.

Alternatively or additionally, the collision force can be converted into a downward-directed tensile force whereby the bumper stiffening includes a projection in a flank opposite a front side of the body part, which contacts the front side at least when the bumper stiffening is pressed back against the body part by a collision and has a recess underneath the projection. Thus, in the case of a collision, a contact point between the projection and the front side of the body part can form an instantaneous axis of rotation about which the rear edge region can rotate where the connection is released by the rotation.

If the bumper stiffening includes a base plate and stiffening ribs projecting upwards from the base plate, the flank can be formed by rear edges of the ribs.

In both the aforementioned embodiments, the ribs can be stiffened by wings projecting in the vehicle transverse direction. Preferably the wings each have a front edge at which they are connected in one piece to the base plate. The wings can extend as far as the rear end of the rib in order to stiffen these directly up to a contact point with the body part.

The bumper stiffening can be curved in longitudinal section with an upwardly facing concavity so that under suitable collision conditions, the bumper stiffening deviates downwards in the region of the concavity and thereby absorbs collision energy and components arranged above the concavity are safe from any damage as a result of their deviation. The bumper stiffening can cross under at least a front part of an engine compartment and specifically in particular a radiator accommodated there.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
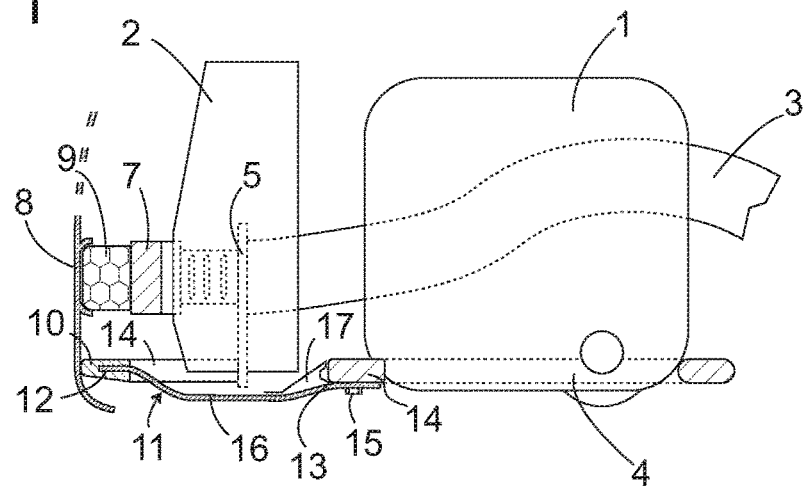
FIG. 1 shows a schematic longitudinal section through a front section of a motor vehicle according to the present disclosure.

FIG. 1 shows a front section of a motor vehicle in a schematic longitudinal section. Located in the engine compartment in the usual manner are an engine 1 and a radiator 2. The engine compartment is flanked on both sides by longitudinal members 3 which are connected to one another to form a rigid frame. An auxiliary frame 4 carrying the engine 1 is fastened movably in a damped manner to this frame.

The longitudinal members 3 are provided with flanges 5 at the front ends thereof, to which an upper bumper cross beam 7 is fastened via crash boxes 6. An intermediate space between the front side of the bumper cross beam 7 and a bumper cladding 8 is filled by a buffer body 9 made of foam.

A lower bumper cross beam 10 is fastened to the flanges 5 below the upper bumper cross beam 7. In a central region extending in front of the radiator 2, the lower bumper cross beam 10 is supported by a bumper stiffening 11 against a collision force acting from the front. A front edge of the bumper stiffening 11 is connected in an arbitrary manner, preferably in a torque-proof manner to the bumper cross beam 10, here it is inserted in a groove 12 on the rear side of the bumper cross beam 10.

A rear edge region 13 of the bumper stiffening 11 is fastened to a front cross beam 14 of the auxiliary frame 4 by fasteners 15 in a manner which will be explained in further detail by reference to FIGS. 2-4. The bumper stiffening 11 formed in one piece from plastic has a base plate 16 which extends continuously from the front edge engaging in the groove 12 into the rear edge region 13. Underneath the radiator 2 the base plate 16 is deflected downwards in the form of a trough extending in the vehicle transverse direction. Stiffening ribs 17 oriented in the vehicle longitudinal direction project from the upper side of the base plate 16.

Figure 2:
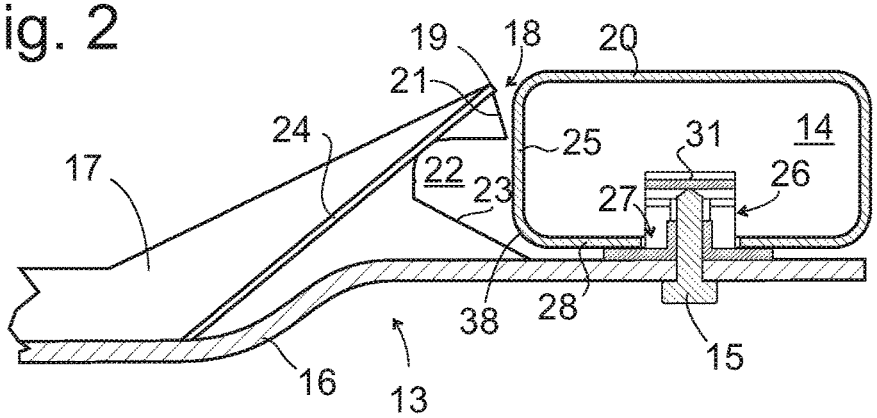
FIG. 2 shows an enlarged detail from FIG. 1 in longitudinal section.
Figure 3:
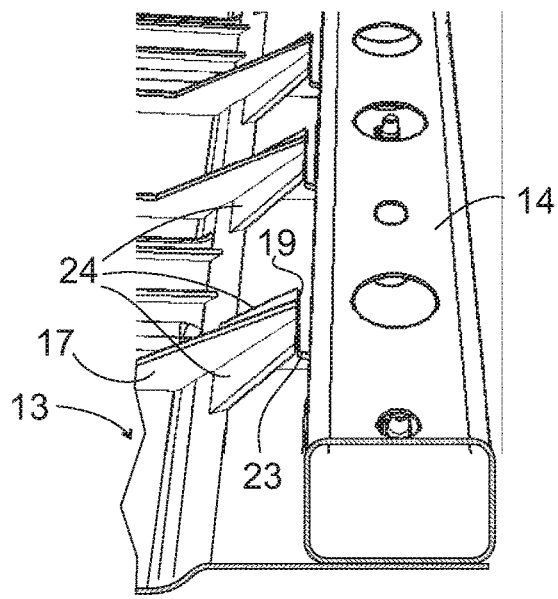
FIG. 3 shows the detail of FIG. 2 in perspective view.
Figure 4:
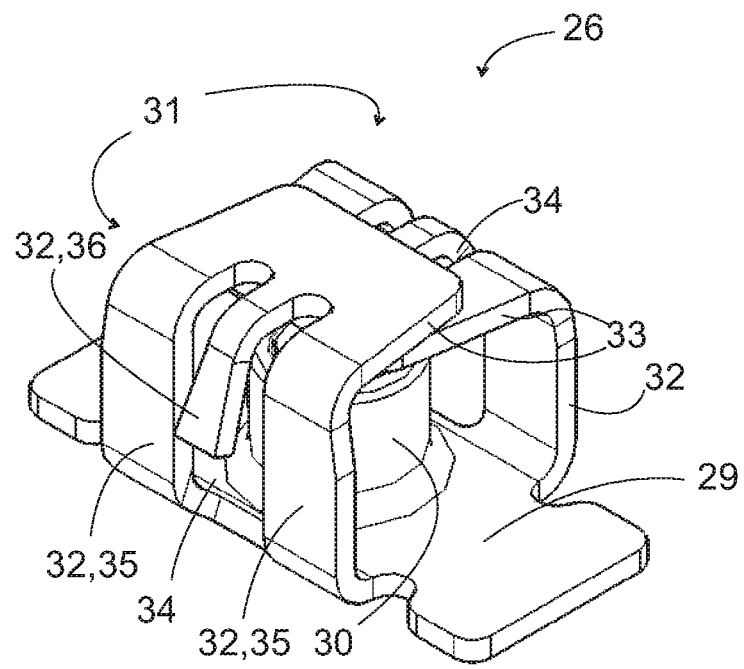
FIG. 4 shows a perspective view of a fastener blind nut used for fastening a bumper stiffening to a body part of the motor vehicle.

FIGS. 2 and 3 show the rear edge region 13 of the bumper stiffening 11 and the cross beam 14, once in section in the vehicle longitudinal direction and once in a cutaway perspective view. The ribs 17 which extend over a large part of the length of the base plate 16 with uniform height increase in height towards the rear end 18 thereof as far as an apex point 19 which is located approximately at the same height as an upper side 20 of the cross beam 14 formed here as a rectangular hollow profile. The rear end 18 of the ribs 17 here includes a steeply dropping or vertical edge section 21 as well as, underneath this edge section 21, a recess 22 which is delimited downwards by an edge 23 which slopes down towards the auxiliary frame 4. The ribs 17 are stiffened in the region of the rear end 18 by wings 24 projecting in the vehicle transverse direction. The wings 24 are, as is clear from FIG. 3, trapezoidal in plan view, where a wide front edge of the trapezium goes over in one piece into the base plate 16 and a rear edge lies opposite a front wall 25 of the cross beam 14.

The base plate 16 extends beyond the rear end 18 of the ribs to under the cross beam 14 and is fastened to this by a plurality of fasteners 15 and blind nut 26 which are here each inserted from below into openings 27 in a lower wall 28 of the cross beam 14. FIG. 4 shows such a blind nut 26 in perspective view. The blind nut 26 is formed in one piece from a sheet metal blank. It includes an approximately rectangular base plate 29 on which a cylinder shaft 30 is formed around a central opening and provided with an internal thread. At the longitudinal edges of the base plate 29, legs 31 are angled on both sides, each including a proximal section 32 orthogonal to the base plate 29 (in the unloaded state shown in FIG. 4) and a distal section 33 angled by 90° with respect to the proximal section, which is bent back over the base plate 29. A U-shaped gap 34 divides the proximal section 32 into two lateral webs 35 and a central finger 36 which is directly connected to the distal section 33 but not to the base plate 29 and projects slightly sideways beyond the webs 35. The distal sections 33 overlap one another in the extension of the cylinder shaft 30.

The openings 27 in the lower wall 28 of the cross beam 14 are rectangular and dimensioned to allow insertion of a blind nut 26 in an orientation in which the longitudinal direction of the base plate 29 coincides with the longitudinal direction of the vehicle. The base plate 29 is longer than the openings 27 so that a stop position of the blind nut 26 is formed by a contact of ends of the base plate 29 with the underside of the lower wall 28. The length of the fingers 36 is matched to the thickness of the wall 28 so that in the stop position the fingers 36 have completely passed through the opening 27 and their tips lie opposite an upper side of the lower wall 28. Thus, the blind nut 26 cannot be withdrawn from the opening 27 again without bending at least the fingers 36.

Figure 5:
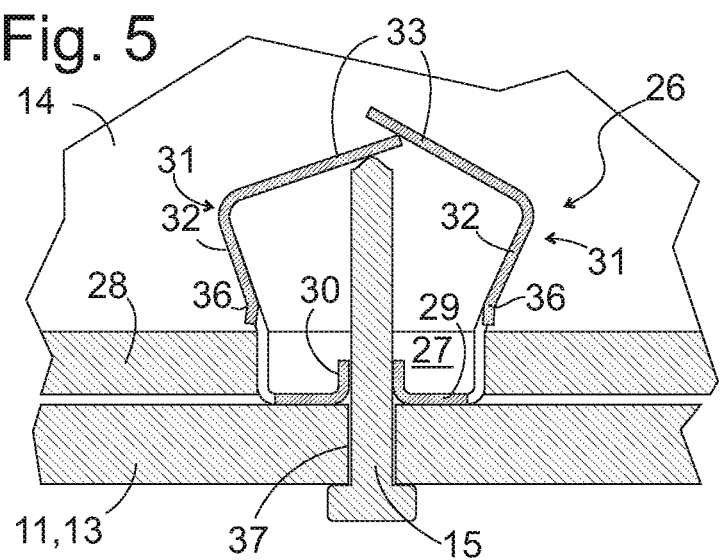
FIG. 5 shows a section through the mounted fastener blind nut in the vehicle transverse direction.

In order to fasten the bumper stiffening 11 on the cross beam 14, the fasteners 15 are passed through holes 37 in the rear edge region 13 of the bumper stiffening 11 as shown in FIG. 5 and screwed into the thread of the cylinder shaft 30. The length of the fasteners 15 is determined so that their tips each impact against the distal sections 33 of the blind nut 26 before the head of the fastener 15 presses the bumper stiffening 11 against the base plate 29 of the blind nut 26. In order to fasten the bumper stiffening 11, the fasteners 15 are thus screwed so far into the blind nut 26 that they splay the legs 31 apart on the other side. In this way each blind nut 26 is anchored positively on the cross beam 14 but this tight fit can be cancelled if a downwardly directed tensile force acts on the blind nut 26 via the fastener 15, which is sufficiently strong to bend the upwardly diverging proximal sections 32 towards one another in a parallel orientation. How large this tensile force is can be predefined exactly and reproducibly by selecting the wall thickness of the blind nut 26 and the shape of the legs 31.

In the case of a collision in a medium velocity range, preferably between 15 and 40 km/h, the bumper cladding 8 and the bumper stiffening 11 are pushed back towards the vehicle interior and the rear end 18 of each rib 17 comes in contact with the front wall 25 of the cross beam 14. If the edge section 21 is sufficiently stiff above the recess 22, a point of the edge section 21 which contacts the front wall 25 can form the axis of a pivoting movement as a result of which, in the view in FIG. 2 in the anticlockwise direction, the bumper stiffening 11 attempts to escape from the collision force. If instead the rib 17 is resilient above the recess 22 and is compressed, the edge 23 slides obliquely downwards along a rounded corner 38 of the cross beam 14.

In both cases, the fasteners 15 and blind nut 26 are subject to a strong, downwardly directed tensile force through which, if this is sufficiently strong, in order to deform the blind nut 26, this is withdrawn from the openings 27 of the cross beam 14. The blind nut 26 is thereby deformed in small space so that despite small size they can absorb an appreciable quantity of collision energy. If the blind nut 26 is torn out from the cross beam 14, the connection between auxiliary frame 4 and bumper stiffening 11 is cancelled. The auxiliary frame 4 is thereby protected from any deformation by forces transmitted by the bumper stiffening 11 and can in any case be deformed if the collision is sufficiently strong in order to compress the entire front section so severely that the longitudinal members 3 are also deformed. Expensive repairs to the auxiliary frame 4 after a collision at moderate speed can therefore be avoided with a high probability which enables a favorable insurance category for the vehicle according to the present disclosure and reduces the operating costs for the holder.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A front section for a motor vehicle comprising:
   a bumper stiffener configured to extend in the vehicle longitudinal direction between a bumper cladding and a body part; and
   a connecting unit configured to fix a rear edge region of the bumper stiffener to an underside of the body part, the connecting unit having a threaded fastener and blind nut for inserting into an opening of the body part and receiving the threaded fastener, wherein a flexible leg formed on the blind nut is reversibly splayed apart when the threaded fastener is received in the blind nut,
   wherein the blind nut includes the flexible leg which are splayed apart by screwing the threaded fastener into a thread of the blind nut, and
   wherein the blind nut comprises a base plate having the thread formed therein, wherein the flexible leg extends from an edge of the base plate.

2. The front section according to claim 1, wherein the flexible leg comprises a plurality of legs, each leg comprising a distal section and a proximal section connecting the distal section to the base plate, wherein at least two proximal sections diverge from the base plate.

3. A front section for a motor vehicle comprising:
   a bumper stiffener configured to extend in the vehicle longitudinal direction between a bumper cladding and a body part; and
   a connecting unit configured to fix a rear edge region of the bumper stiffener to an underside of the body part, the connecting unit having a threaded fastener and blind nut for inserting into an opening of the body part and receiving the threaded fastener, wherein a flexible leg formed on the blind nut is reversibly splayed apart when the threaded fastener is received in the blind nut,
   wherein the bumper stiffener comprises sliding surfaces to provides the body part when the bumper stiffener is moved rearward relative to the body part.

4. The front section according to claim 3, wherein the sliding surface is inclined towards the vehicle interior.

5. The front section according to claim 3, wherein the bumper stiffener comprises a base plate and a stiffening rib projecting upwards from the base plate, wherein the sliding surface is formed by an edge of the rib.

6. A front section for a motor vehicle comprising:
   a bumper stiffener configured to extend in the vehicle longitudinal direction between a bumper cladding and a body part; and
   a connecting unit configured to fix a rear edge region of the bumper stiffener to an underside of the body part, the connecting unit having a threaded fastener and blind nut for inserting into an opening of the body part and receiving the threaded fastener, wherein a flexible leg formed on the blind nut is reversibly splayed apart when the threaded fastener is received in the blind nut,
   wherein the bumper stiffener comprises a projection in a flank opposite a front side of the body part and a recess formed underneath the projection, wherein the projection is configured to contact the front side at least when the bumper stiffener is moved rearward relative to the body part.

7. The front section according to claim 6, wherein the bumper stiffener comprises a base plate and a stiffening rib projecting upwards from the base plate, wherein the flank is formed by a rear end of the ribs.

8. The front section according to claim 5, wherein the rib is stiffened by a wing projecting in the vehicle transverse direction.

9. The front section according to claim 8, wherein the wing is connected in one piece to the base plate at a front edge.

10. The front section according to claim 8, wherein the wing extends to a rear end of the rib.

11. The front section according to claim 8, wherein the wing is tapered towards a rear edge thereof.

12. The front section according to claim 1, wherein the bumper stiffener is curved in longitudinal section with an upwardly facing concavity.

13. The front section according to claim 1, wherein the bumper stiffener includes a front portion configured to cross under at least a front part of an engine compartment.

14. The front section according to claim 13, wherein the front portion is configured to cover a radiator.

* * * * *